United States Patent

Gerathewohl

[15] 3,681,572

[45] Aug. 1, 1972

[54] AIR TRAVELER'S REST PERIOD CALCULATOR

[72] Inventor: Siegfried Johannes Gerathewohl, 5208 Albemarle St., Bethesda, Md. 20016

[22] Filed: Aug. 11, 1970

[21] Appl. No.: 62,959

[52] U.S. Cl. ................................................. 235/88
[51] Int. Cl. ............................................. G04b 37/00
[58] Field of Search .................................. 238/78, 88

[56] References Cited

UNITED STATES PATENTS

| | | | |
|---|---|---|---|
| 2,418,933 | 4/1947 | Hill | 235/78 |
| 2,694,522 | 11/1954 | Sturgeu et al. | 235/88 |
| 3,232,253 | 2/1966 | Hodge, Jr. | 235/78 X |
| 3,253,780 | 5/1966 | Stewart et al. | 235/78 |

*Primary Examiner*—Richard B. Wilkinson
*Assistant Examiner*—Stanley A. Wal

[57] ABSTRACT

A device are described for calculating the periods of rest necessary for the physical and mental well-being of an air traveler after long-distance flights. The device is basically a pocket-sized calculator consisting of two concentric discs and a pointer. The larger disc is subdivided in an outer and an inner ring. The outer ring is marked in 10 and 5 degree intervals which indicate the travel time in hours and half-hours, respectively. The center ring is marked to show the duration of the rest period in hours. The smaller disc bears the scales of the additional five parameters which determine the length of the rest period. The overlaying pointer, which can be rotated about the center of the device, provides for the reference setting of each parameter, for their summation, and for the reading of the final result.

1 Claim, 2 Drawing Figures

PATENTED AUG 1 1972　　　　　　　　　3,681,572

INVENTOR.
SIEGFRIED JOHANNES GERATHEWOHL

AIR TRAVELER'S REST PERIOD CALCULATOR

BACKGROUND OF THE INVENTION

The effects of long-distance journeys on the physiological and mental functions of the traveler became a matter of scientific study after the realization of modern air travel and global flights. The experiences of the traveler are compounded in the so-called "jet-flight stress syndrom," which generally is a feeling of tiredness, fatigue, listlessness or irritation associated with sleeplessness, lack of appetite, interest, initiative and activity shortly after arrival. This syndrom not only deprives the traveler of his enjoyment of the trip and his sojourn at the point of destination, but also detrimentally affects his behavior, the conduct of his business, and the performance of his duties. It has been voiced by experts on this subject that this century has witnessed out-of-character behavior and inept decisions at the highest level of authority by persons who were not aware of the inadequate adaptation of their organism to the new environment. A multitude of scientific investigations were therefore conducted during the past ten years which demonstrated quantitatively the performance decrement of test subjects, passengers, and crews after actual or simulated long-distance flights.

What are the main parameters which affect the physical and mental state of the jet-age traveler?

A traveler's physical and mental state after a long-distance flight is generally influenced by (1) personal factors, such as emotional and health status, age, motivation, and adaptability; (2) geographic and environmental factors, such as climate, departure, and arrival time; geographic translocation; and the associated time-zone shifts, altitude, and accommodations; and (3) operational factors, such as duration of flight, flying speed, and number of stops or stays on the ground. In 1967 a formula was proposed by the Staff Advisory Committee of the International Civil Aviation Organization (ICAO), in which four of these factors were used for computing a physiological rest period after long flights. The formula was:

Rest period (in tenth of a day) = Flight duration (in hours)/2 + Number of time zones in excess of 4 + Departure time coefficient + Arrival time coefficient.

Although this formula has been used by some individuals and organizations to compute rest periods after long flights, it was not adopted by the United Nations for common practice. There are several shortcomings of the ICAO formula:

1. The ICAO formula does not include the bidirectional factor which is important in case of East-West and West-East dislocations.

2. The ICAO formula does not include the physiological time-zone shifts associated with longitudinal changes of less than 75°. However, these shifts must be considered already in case of U.S. transcontinental flights; and their effect can be severe if they are combined and act synergistically with large latitudinal (North-South) dislocations.

3. The ICAO formula does not include an age factor. However, there are indications that age is an important parameter which is related to the physiological adaptation of the traveler to changes of the diurnal cycle.

4. Although it has been established by experience that the ICAO formula is beneficial for certain long-distance flights in the East-West direction, two most critical factors - namely, geodirectional differences and age - were not observed. These factors were not obvious to the scientists concerned about time-zone desynchronization. The discovery of their consequences was due to new research data obtained and used by the inventor.

5. The ICAO formula is only "on the books" and is not available in any practical form to the air traveler or tourist.

In order to improve the calculation of the length of physiologic rest periods after long-distance flights, a new formula was therefore developed by the inventor which includes the age and geodirectional factors, expands the local departure and arrival time coefficients, and realistically considers relatively small time-zone changes to benefit the traveler. The new formula reads:

Rest period = Travel time in hours + Departure time coefficient + Number of time zones + Arrival time coefficient + Geodirectional coefficient + Age coefficient, or $$RP = T_t + D_{tc} + T-Z + A_{tc} + G_c + A_c.$$

This formula is scientifically more accurate, easier to apply than the old formula because hours are used for input and output, and its results are in close approximation but more reasonable than those of the former.

SUMMARY OF THE INVENTION

This invention concerns the attenuation of physical and mental effects of long-distance flights. It is based on a new formula to be used for calculating physiological rest periods to combat jet-flight fatigue. The Air Traveler Restometer, which is the subject of this invention, enables the traveler to compute the rest period following the trip immediately, quickly, without difficulty, and without supporting material and assistance. This period is recommended by physicians and scientists as a minimum in order that the traveler will be in the best physical and mental condition to enjoy his stay at the place of arrival or take care of his business and optimally perform his duties. The calculations are based on the latest scientific data concerning the desynchronization of biological functions and other stress factors associated with jet travel and time-zone fatigue.

Another objective of this invention is to furnish a rest period calculator which is simple and inexpensive to manufacture, easy to carry along, quick to use, reliable and durable in operation, and can be made available to a large segment of the traveling public.

Another objective of this invention is to make practical use of a new and accurate formula for the benefit of people who are on pleasure or on business trips so that they can get the maximum return and avoid costly errors or failures in business as well as improper decisions in official or political matters.

Another objective of the invention is to help private, military, and airline pilots and crews to properly plan non-scheduled and scheduled flights in order to avoid aircraft accidents owing to insufficient recreation, sleep, and rest periods.

Another objective of this invention is to provide to the military, technical, and political officers, organizers, and leaders a practical and useful tool for on-the-spot calculations of respective personnel, manpower, and efforts or resources available for alert, combat, and emergency conditions after lone-distance air transports or air evacuations.

Another objective of this invention is to provide a rest period calculator, which can be supplemented by adding other related features, such as pictorial displays of the shift of the diurnal cycle and physiological profiles resulting from the geodirectional displacement of the traveler.

The six factors - travel time, number of time zones, departure time, arrival time, direction of flight, and age - are significantly related to the physiological rest period. It is a well-known fact that length of travel alone is so stressful during long-distance flights that a 1-to-1 hour relationship between flight duration and rest period has been accepted for air carrier operations. While the ICAO formula weighs time-zone shifts in excess of 4 equally with travel, departure, and arrival times, the new formula developed by the inventor considers time-zone shifts from 1 to 12 hours in accordance with the newest scientific data. Cycles of sleep-wakefulness, oral temperature, psychomotor function, and renal excretions of 17-OH corticosteroids, 17-corticosteroids, sodium and potassium were studied in healthy subjects during West-East and East-West displacements, and their desynchronization curves were plotted over the 36-hour travel, resulting in a sector of approximately 150° as shown in FIG. 1. The relationship of the stepwise increments of this scale to rest period is in agreement with the original experimental results.

For example, a rest period of 9 hours is allowed by the ICAO formula after a flight from Montreal, Canada, to Sidney, Australia, because of time-zone shifts alone; and a 15-hour rest period will account for the time-zone shift in traveling half-way around the world.

The weights of the departure and arrival time factors are in close approximation to that of the ICAO formula, which has yielded the desired results. The increased weighting given the later hours for departure helps to compensate for the effects of loss of sleep. Also, the high arrival time coefficient for the period 0800 to 1159 helps to compensate for the disruption experienced during early-morning flights plus the effect of arriving at the beginning of a workday without sufficient rephasing of the diurnal rhythm. The sizes of the sectors or increments on the scale of the Restometer were obtained by a geometric transformation of the accepted ICAO values.

Recent research has clearly indicated the longer adjustment time of psychophysiologic functions necessary after West-East displacement. Mathematically, the scales of the bidirectional coefficient are a supplement to the time-zone factors, and their size was experimentally determined. Since readjustment after West-to-East flights was found to take almost twice as long as after flights in the East-West direction, twice as many rest hours are allowed after West-East flights than vice versa.

Finally, the size of the age allowances on the scale were empirically established. Recent studies on aging have shown that adjustment to new situations and unknown conditions is not as rapid after age 40. The scale values on the device were affixed accordingly.

The advantages and merit of the invention will become apparent with the following description and display of the device, wherein.

DESCRIPTION OF THE PREFERRED EMBODIMENTS

Figure 1:
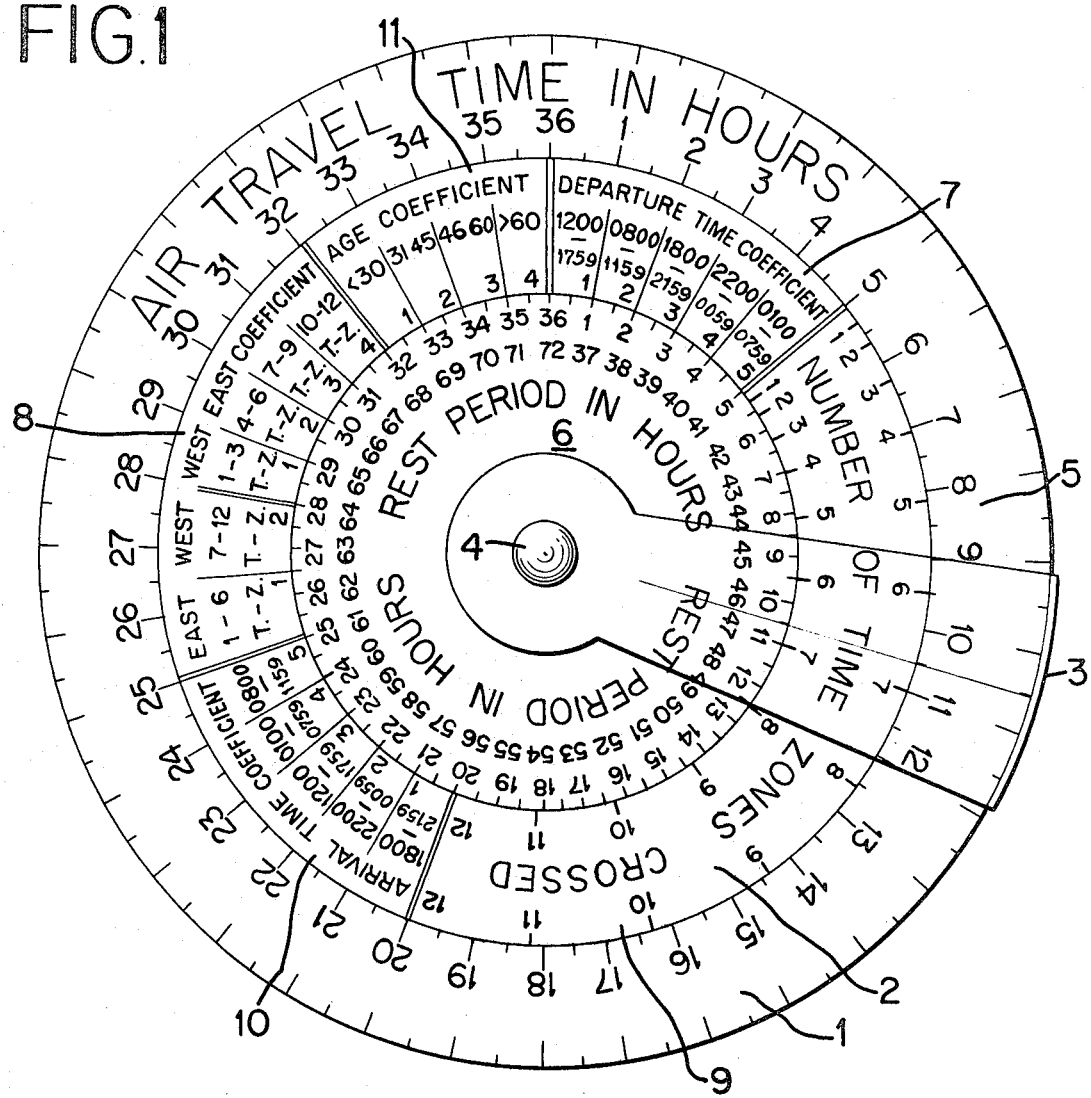
FIG. 1 is a plain view of the Restometer in accordance with this invention.
Figure 2:
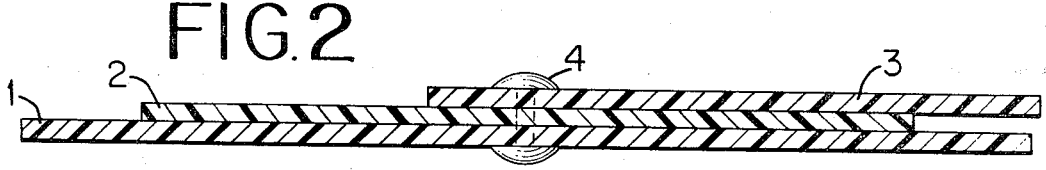
FIG. 2 is a cross-sectional view of the Restometer shown in FIG. 1.

The invention — referred to herein as the "Air Traveler Restometer" — consists of a set of two concentric discs 1 2 and a pointer 3 which can be made of transparent plastics, the pointer having a hairline or indicator mark. The pointer is affixed in the center of the disc by a circular metal clamp 4. The Air Traveler Restometer, which resembles a circular slide rule and is operated in a similar fashion, bears the scales of the six parameters of the improved. As shown in FIG. 1, the large disc is subdivided into an outer ring 5 and an inner ring 6. The outer ring is marked in 10° and 5° intervals, carrying the numbers from 1 to 36 which indicate the number of hours spent in travel. This scale is therefore marked as "Air Travel Time in Hours". The center ring, which is part of the large disc, is marked in 10° intervals carrying the numbers from 1 to 72 on a double scale. This scale shows the "Rest Period in Hours." The smaller disc, which is transparent in its center to allow for the reading of the rest period, bears the scales of the other five parameters which relate to the rest period — namely, the local departure-time coefficient 7, the directional coefficient 8, the number of time zones crossed 9, the local arrival time coefficient 10, and the age coefficient 11. Specifically, the parameters are scaled as follows: the departure-time coefficient and the arrival-time coefficient are weighed in accordance with the diurnal performance as determined by scientific experiments conducted on pilots and non-pilot populations. The time-zone scale is graded as a cyclic function in accordance with circadian adjustment to local time after geographic dislocation. The geodirectional coefficient is weighed differently for West-to-East and East-to-West flights, since the circadian acrophase adjustment after West-East flights is slower than after East-West dislocation. Hence, traveling from West to East contributes twice as many credit points to the rest period than traveling from East to West. Finally, the age coefficient is weighed so that older persons get more credit after long-distance flights than younger ones.

In order to calculate the recommended period of rest, the pointer 12 is set at the zero mark of the "Air Travel Time in Hours" scale and then moved to the number indicating the number of hours traveled, for example, 7. Next, the zero point (left border) of the departure-time coefficient is placed under the hairline of the pointer and the pointer then moved in the clockwise direction until — if the local time of departure happened to be 10:00 p.m. or 2,200 — it indicates the 4 credit points allowed for this late departure time. This adds up to 11 hours of credit. Next the zero point of the time-zone scale is placed under the hairline, and the number of time zones crossed, for example, 6, is added by moving the pointer again in the clockwise direction — adding up to 15.5. Next the local arrival time coefficient is added by again setting the zero position under the hairline and then moving the pointer clockwise to 5 — if the plane happens to arrive at 8:30 a.m. or 0830 local time, which is a bad time for catching up on sleep. This now amounts to 20.5 hours credit. Since this was a West-to-East flight, the traveler is entitled to 2 directional credits. Again the zero position of the West-East scale is placed under the hairline and the pointer then moved to indicate the 2. The credit hours are now 22.5. Lastly, the age coefficient, for example, 2, is added by following the now-familiar procedure. In this way, a total of 25 hours is obtained, this total being shown on the center scale. This is the physiological rest period recommended to the traveler after a night-flight from New York to London.

Since several different embodiments of this invention may be made without departing from the principle and scope thereof, it is to be understood that the specific embodiment described in detail herein is not be be taken in a limiting sense.

I claim:

1. A disc-shaped calculator for determining physiologically-required rest periods after long-distance flights involving time-zone shifts. This device comprisesa. a circular baseplate carrying reference markings indicating air-travel time in hours and rest period in hours marked in 5° and 10° intervals about the circumferences of an inner and an outer ring separated by an empty ring, the inner ring having a double scale for rest periods up to 72 hours, given in numbers from 1 to 72;

b. a transparent, circular plate of smaller size than the baseplate overlying it and attached at its center to permit rotational movement; subdivided into five major sectors carrying the indicia of the five critical factors — number of time zones crossed, arrival-time coefficient, East-West/West-East coefficient, age coefficient, and departure-time coefficient clockwise in this order; filling the interspace between the inner and outer rings of the base plate; and having a predetermined relation to said first-reference markings;

c. a transparent cursor member overlying the two circular plates, extending in radius slightly over the baseplate for easy rotation and carrying a center hairline indicator which can be set on the respective indicia on the outer ring and the smaller disc carrying said critical factors or coefficients for calculating rest periods, thus relating the travel time, time-zone shifts, and departure-time, arrival-time, bidirectional, and age coefficients to the rest period as shown on the scale of the inner ring; and d. means for holding the two discs and the cursor together for rotating about a common axis, the described arrangement making it possible for the smaller disc and the cursor to be rotated independently of each other so that the said relationship of the indicia of the three circular scales can be obtained.

* * * * *